US011363883B2

(12) United States Patent
Lert, Jr. et al.

(10) Patent No.: US 11,363,883 B2
(45) Date of Patent: Jun. 21, 2022

(54) MODULAR STRUCTURE FOR AN AUTOMATED STORAGE AND RETRIEVAL SYSTEM

(71) Applicant: ALERT INNOVATION INC., North Billerica, MA (US)

(72) Inventors: John G. Lert, Jr., Wakefield, MA (US); Martin R. Elliott, Bedford, NH (US); William J. Fosnight, Windham, NH (US); Christopher J. Dancewicz, Salem, NH (US); Michael Chesna, Saugus, MA (US); Tsepa Bayul, Lowell, MA (US)

(73) Assignee: Alert Innovation Inc., North Billerica, MA (US)

( * ) Notice: Subject to any disclaimer, the term of this patent is extended or adjusted under 35 U.S.C. 154(b) by 0 days.

(21) Appl. No.: 17/179,068

(22) Filed: Feb. 18, 2021

(65) Prior Publication Data

US 2021/0169219 A1 Jun. 10, 2021

Related U.S. Application Data

(62) Division of application No. 16/269,933, filed on Feb. 7, 2019, now Pat. No. 10,952,533.

(Continued)

(51) Int. Cl.
*A47B 47/00* (2006.01)
*A47B 87/00* (2006.01)
(Continued)

(52) U.S. Cl.
CPC ...... *A47B 47/0091* (2013.01); *A47B 47/0083* (2013.01); *A47B 87/008* (2013.01);
(Continued)

(58) Field of Classification Search
CPC . A47B 87/008; A47B 87/007; A47B 47/0091; A47B 47/0083; A47B 47/021;
(Continued)

(56) References Cited

U.S. PATENT DOCUMENTS 2,812,069 A * 11/1957 Trammell ............... A47B 53/02
 211/162
3,552,648 A * 1/1971 Thompson ............... B65G 1/02
 238/287

(Continued)

FOREIGN PATENT DOCUMENTS

EP 1260458 A1 11/2002
JP 1981-166841 12/1981

OTHER PUBLICATIONS

Office Action dated Aug. 25, 2021 in Japanese Patent Application No. 2020-541764.

(Continued)

*Primary Examiner* — Jennifer E. Novosad
(74) *Attorney, Agent, or Firm* — Vierra Magen Marcus LLP

(57) ABSTRACT

An automated system structure may be quickly and efficiently assembled using a number of storage modules. Storage modules may be comprised of a pair of shelf modules, each comprising a number of defined storage locations for storing totes, cartons, trays or other containers. The shelf modules may themselves be modular units comprising a number of horizontal storage levels affixed to a pair of vertical support assemblies at each end of the shelf modules. The pair of shelf modules may be accurately spaced from each other by mounting the shelf modules to tie beams at the bottom and tie plates at the top.

17 Claims, 15 Drawing Sheets

Related U.S. Application Data

(60) Provisional application No. 62/628,176, filed on Feb. 8, 2018.

(51) Int. Cl.
*B65G 1/02* (2006.01)
*B65G 1/137* (2006.01)
*B65G 1/06* (2006.01)
*B65G 1/04* (2006.01)

(52) U.S. Cl.
CPC ............... *B65G 1/02* (2013.01); *B65G 1/026* (2013.01); *B65G 1/0492* (2013.01); *B65G 1/065* (2013.01); *B65G 1/1375* (2013.01); *B65G 2207/30* (2013.01)

(58) Field of Classification Search
CPC . A47B 47/027; A47B 47/028; A47B 47/0058; B65G 1/02
USPC .................. 211/191, 192, 188, 194; 52/36.4; 248/500, 501, 507, 154
See application file for complete search history.

(56) References Cited

U.S. PATENT DOCUMENTS

| | | | | |
|---|---|---|---|---|
| 3,737,047 A * | 6/1973 | Ruth | ........................ | B65G 1/10 211/162 |
| 4,153,312 A * | 5/1979 | Taniwaki | ............... | A47B 53/02 105/86 |
| 4,248,563 A * | 2/1981 | Fur | .......................... | B65G 1/06 198/718 |
| 4,261,470 A * | 4/1981 | Dolan | ....................... | F16B 7/22 211/191 |
| 4,428,708 A * | 1/1984 | Burt | ..................... | B65G 1/0421 414/275 |
| 4,708,252 A * | 11/1987 | Azzi | ....................... | A47B 57/04 108/108 |
| 4,955,489 A * | 9/1990 | Allen | ..................... | B65G 1/026 211/151 |
| 5,072,838 A * | 12/1991 | Price, Jr | ............. | G11B 15/6825 211/162 |
| 5,316,157 A * | 5/1994 | Konstant | ................ | A47B 53/00 211/151 |
| 5,361,481 A * | 11/1994 | Lloyd | ................... | B65G 1/0407 29/407.01 |
| 5,377,851 A * | 1/1995 | Asano | .................. | A47B 47/022 211/191 |
| 5,749,481 A * | 5/1998 | Miller | ................... | A47B 47/021 211/187 |
| 5,785,397 A * | 7/1998 | Pavelski | ............... | F16B 5/0208 312/111 |
| 6,042,321 A * | 3/2000 | Labell | .................. | B65G 1/0414 414/276 |
| 6,241,106 B1 * | 6/2001 | Fujita | ..................... | A47B 53/02 211/134 |
| 6,682,253 B2 * | 1/2004 | Binna | ....................... | F16L 3/00 403/263 |
| 7,124,902 B1 * | 10/2006 | Chen | ....................... | A47B 53/02 211/162 |
| 7,263,806 B2 * | 9/2007 | Pellegrino | ............ | A47B 47/021 248/564 |
| 7,469,793 B2 * | 12/2008 | Chen | ....................... | A47B 53/02 211/162 |
| 8,172,098 B2 * | 5/2012 | Eustace | .................. | A47B 57/22 211/191 |
| 8,434,275 B2 * | 5/2013 | Hashimoto | ....... | E04F 15/02452 52/126.6 |
| 8,459,475 B2 * | 6/2013 | Higueroa | ............... | A47B 96/00 211/162 |
| 8,985,716 B2 * | 3/2015 | Lundrigan | ............ | H02B 1/301 312/265.3 |
| 9,020,632 B2 * | 4/2015 | Naylor | ................. | B65G 1/0492 700/218 |
| 9,232,856 B2 * | 1/2016 | Yaniak | ...................... | B65G 1/02 |
| 9,458,643 B2 * | 10/2016 | Young | .................. | E04H 13/006 |
| 9,676,517 B2 * | 6/2017 | Jiang | ..................... | H05K 7/1488 |
| 9,796,527 B1 * | 10/2017 | Kaukl | .................. | B65G 1/0492 |
| 9,999,301 B2 * | 6/2018 | Stauffer | ................ | A47B 47/021 |
| 10,271,449 B1 * | 4/2019 | Yousif | ...................... | H04Q 1/02 |
| 10,336,540 B2 * | 7/2019 | Gravelle | .............. | B65G 1/0478 |
| 10,343,286 B2 * | 7/2019 | Vain | ....................... | G06Q 10/00 |
| 10,400,454 B1 * | 9/2019 | Lellimo | .................... | E04B 1/19 |
| 10,480,200 B2 * | 11/2019 | Kobayashi | ........ | E04F 15/02417 |
| 10,765,029 B2 * | 9/2020 | Bonenfant | .......... | A47B 47/0091 |
| 10,952,533 B2 * | 3/2021 | Lert, Jr. | ............... | B65G 1/0492 |
| 11,155,407 B2 * | 10/2021 | Stefani | .................... | E04H 9/021 |
| 2001/0035386 A1 * | 11/2001 | Mancini | ............... | B65G 1/0442 211/189 |
| 2002/0139766 A1 * | 10/2002 | Courtwright | .......... | B65G 1/026 211/191 |
| 2003/0010740 A1 * | 1/2003 | Konstant | ............... | A47B 47/028 211/189 |
| 2004/0184901 A1 * | 9/2004 | Taguchi | ............... | B65G 1/0492 414/270 |
| 2004/0256339 A1 * | 12/2004 | Welsch | ................... | A47B 53/02 211/162 |
| 2005/0084748 A1 * | 4/2005 | Miller | .................... | H01M 10/42 429/99 |
| 2005/0162051 A1 * | 7/2005 | Madsen | ................ | A47B 87/007 312/287 |
| 2005/0186053 A1 * | 8/2005 | Itoh | ......................... | B65G 1/137 414/285 |
| 2006/0237378 A1 * | 10/2006 | Pellegrino | ............. | A47F 5/0018 211/29 |
| 2010/0078399 A1 * | 4/2010 | Higueroa | ............. | A47B 47/027 211/71.01 |
| 2011/0238207 A1 * | 9/2011 | Bastian, II | ............. | B65G 61/00 700/217 |
| 2012/0029687 A1 * | 2/2012 | Hagen | .................. | G07F 11/1657 700/218 |
| 2013/0105428 A1 * | 5/2013 | Yaniak | ....................... | B62B 1/10 211/168 |
| 2013/0245810 A1 * | 9/2013 | Sullivan | ................ | B65G 1/1371 700/214 |
| 2014/0060770 A1 * | 3/2014 | Blumenau | ............... | B22D 33/00 164/154.1 |
| 2014/0277693 A1 * | 9/2014 | Naylor | .................. | B65G 1/0492 700/218 |
| 2014/0326685 A1 * | 11/2014 | Frazier | ..................... | B65G 1/02 211/13.1 |
| 2016/0214797 A1 * | 7/2016 | Pankratov | ................ | B65G 1/04 |
| 2016/0355337 A1 * | 12/2016 | Lert | ...................... | B65G 1/1378 |
| 2017/0101264 A1 * | 4/2017 | Brumm | .................... | B60L 5/40 |
| 2018/0223541 A1 * | 8/2018 | Kobayashi | ........... | H05K 7/1497 |
| 2018/0237183 A1 * | 8/2018 | McGhee, III | ...... | A47B 96/1441 |
| 2019/0168392 A1 * | 6/2019 | Vain | ...................... | B65G 1/0407 |
| 2019/0182978 A1 * | 6/2019 | Bonenfant | .......... | A47B 47/0091 |
| 2019/0239640 A1 * | 8/2019 | Lert, Jr. | ................. | B65G 1/0492 |
| 2020/0240132 A1 * | 7/2020 | Barreto | ..................... | E04B 1/40 |
| 2021/0169219 A1 * | 6/2021 | Lert, Jr. | ................. | B65G 1/026 |

OTHER PUBLICATIONS

International Search Report and Written Opinion dated Apr. 29, 2019 in International Patent Application No. PCT/US2019/017080.
English language Abstract for EP1260458 published Nov. 27, 2002.
Non-Final Rejection dated Jan. 13, 2020 in U.S. Appl. No. 16/269,933.
Amendment filed Apr. 16, 2020 in U.S. Appl. No. 16/269,933.
Restriction Requirement dated May 1, 2020 in U.S. Appl. No. 16/269,933.
Amendment filed Jun. 10, 2020 in U.S. Appl. No. 16/269,933.
Final Rejection dated Jul. 2, 2020 in U.S. Appl. No. 16/269,933.
Amendment dated Oct. 29, 2020 in U.S. Appl. No. 16/269,933.
Notice of Allowance and Fees Due dated Nov. 18, 2020 in U.S. Appl. No. 16/269,933.

(56) References Cited

OTHER PUBLICATIONS

Response to Search Report and Written Opinion filed Mar. 26, 2021 in European Patent Application No. 19707200.2.

* cited by examiner

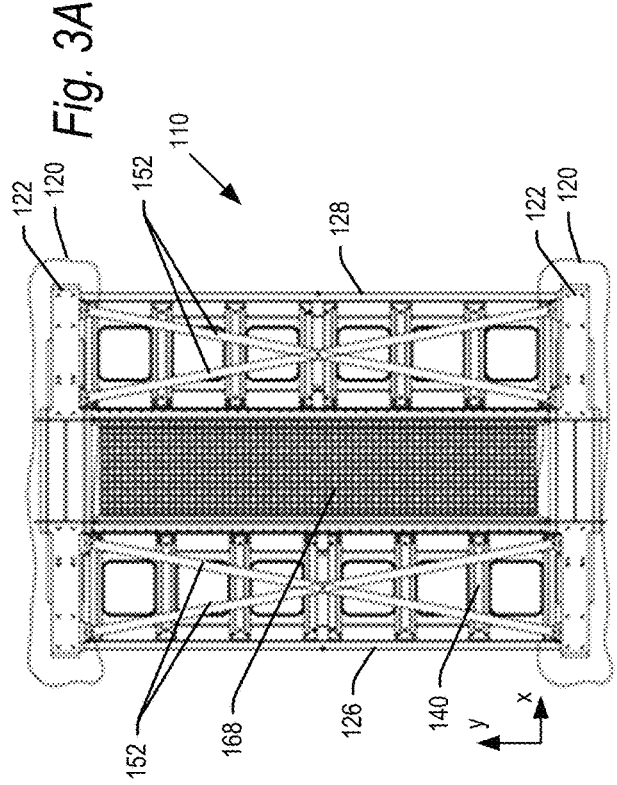
Fig. 3A
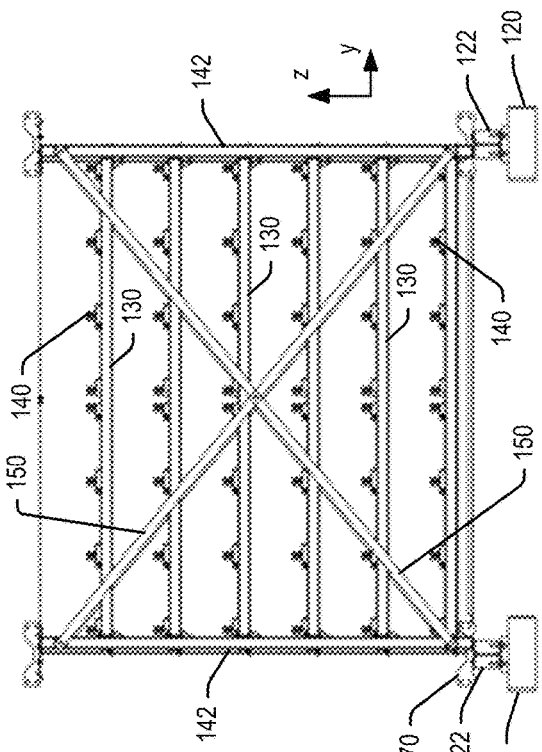
Fig. 3C
Fig. 3B

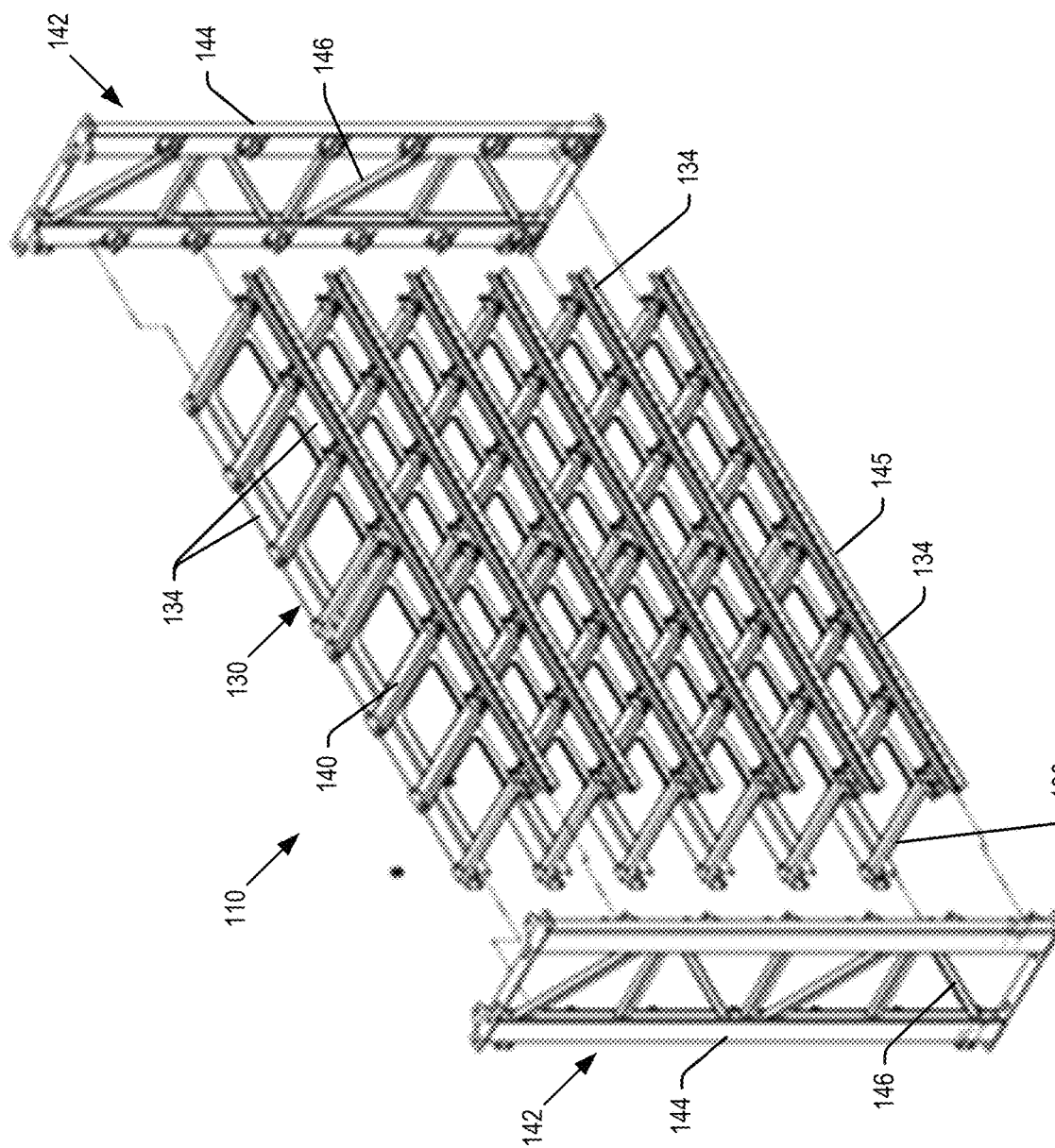

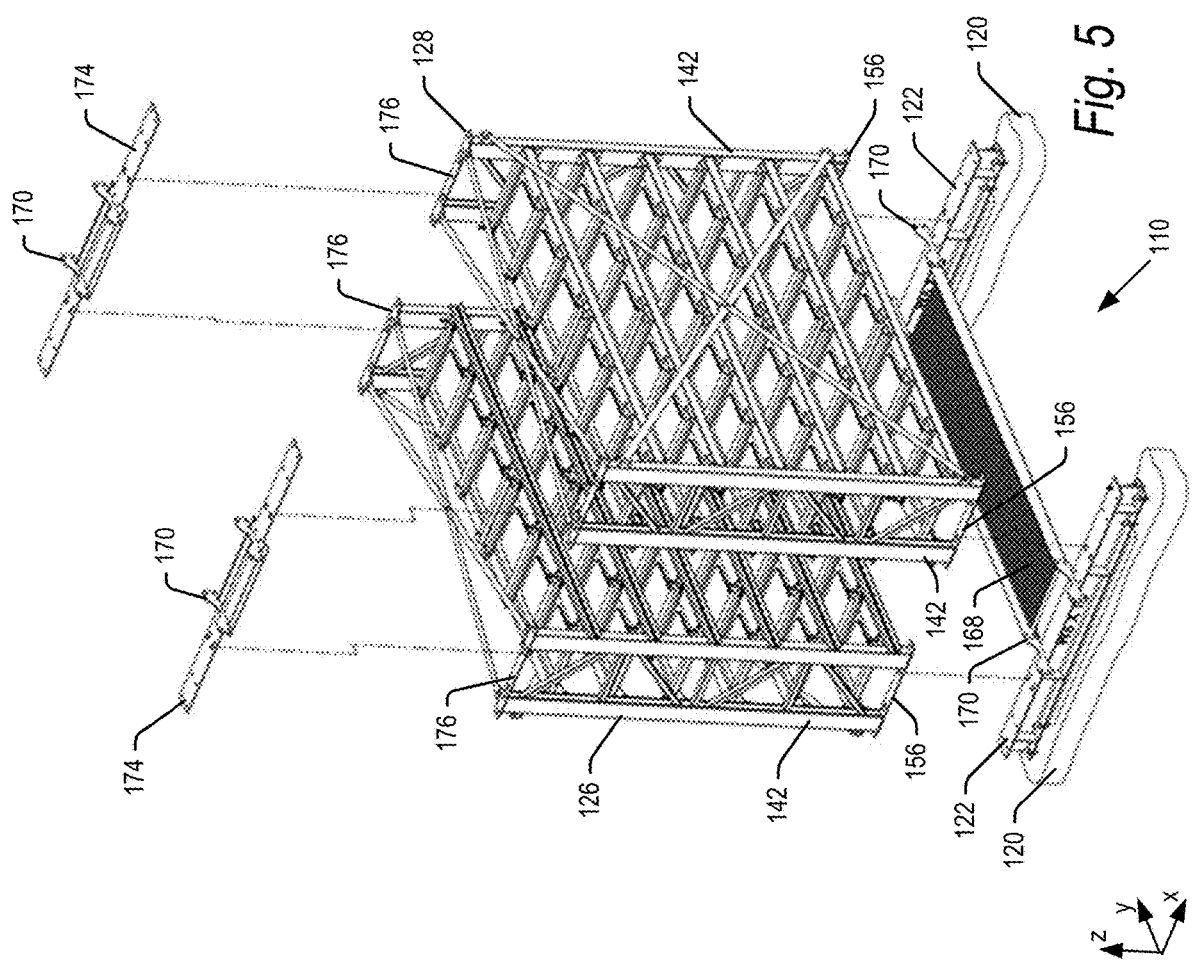

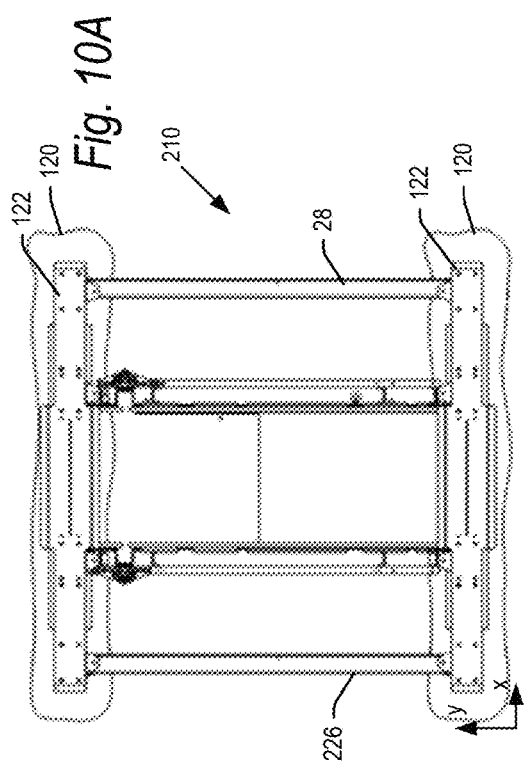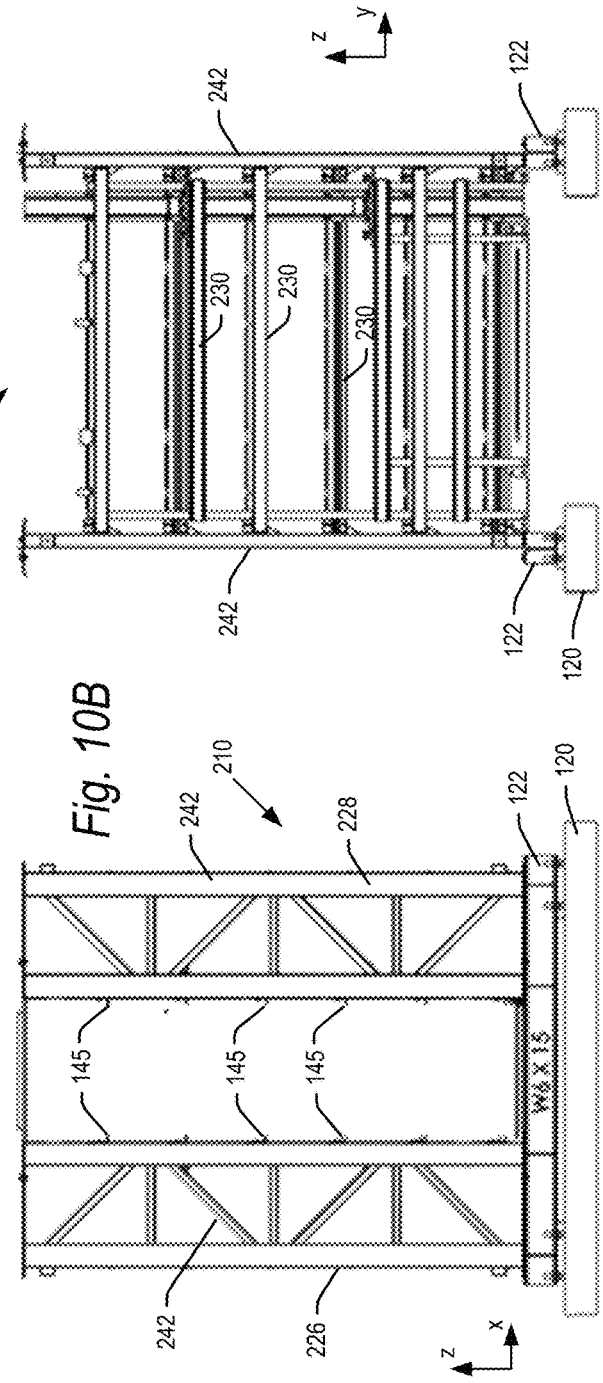

MODULAR STRUCTURE FOR AN AUTOMATED STORAGE AND RETRIEVAL SYSTEM

PRIORITY CLAIM

The present application is a divisional of U.S. patent application Ser. No. 16/269,933, filed on Feb. 7, 2019, entitled "MODULAR STRUCTURE FOR AN AUTOMATED STORAGE AND RETRIEVAL SYSTEM," which application claims priority to U.S. Provisional Patent Application No. 62/628,176, filed on Feb. 8, 2018, entitled "MODULAR STRUCTURE FOR AN AUTOMATED STORAGE AND RETRIEVAL SYSTEM," which applications are incorporated by reference herein in their entirety.

BACKGROUND

An automated order fulfillment system for use in supply chains may fulfill orders for individual product items, also referred to herein as "eaches." Traditional order fulfillment facilities store eaches in containers in a multi-level storage structure with a vertical and horizontal array of storage spaces. The automated order fulfillment system further includes mobile robots which move horizontally and vertically within the structure to transfer containers to and from the storage spaces within the structure.

At present, automated system structures are built by assembling individual components together one piece at a time, sometimes referred to as "stick-built" structures. For example, the rails for the first horizontal level are individually affixed to vertical rails. The second horizontal level is then affixed to the vertical rails, and so on. The "stick-built" approach has the disadvantage of requiring numerous, time-consuming adjustments required for reliable mobile robot operation. Due in part to advances in order fulfillment mobile robot technology and increased demand for automated product delivery, there has recently been significant a growth of and demand for automated order fulfillment facilities. In order to meet that demand, there is a need to quickly and efficiently build structures for use in such facilities.

SUMMARY

The present technology relates to a structure for automated storage facilities which may be quickly and efficiently assembled using a number of storage modules. Storage modules may be comprised of a pair of shelf modules, each comprising a number of defined storage locations for storing totes, cartons, trays or other containers. The pair of shelf modules are accurately spaced apart from each other so as to allow a mobile robot to pass between the pair of shelf modules and retrieve or deliver inventory to storage locations in either shelf module in the finished storage structure. Tower modules used by robots to climb within the structure may be assembled in a similar manner.

The pair of shelf modules may be accurately spaced from each other by mounting the shelf modules to tie beams at the bottom and tie plates at the top. The tie beams and plates have registration features which mate with registration features on the top and bottom surfaces of the shelf modules to ensure quick and accurate spacing of the shelf modules from each other. The tie beams and tie plates have additional registration features to allow for quick and accurate assembly of multiple storage modules oriented horizontally and/or vertically with respect to each other.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIGS. 3A, 3B and 3C are top, end and side views of a storage module according to embodiments of the present technology.

FIG. 4A is an exploded perspective view of a shelf module according to embodiments of the present technology.

FIG. 5 is an exploded perspective view of a storage module according to embodiments of the present technology.

FIGS. 10A, 10B and 10C are top, end and side views of a tower module according to embodiments of the present technology.

DETAILED DESCRIPTION

The present technology, roughly described, relates to an automated system structure which may be quickly and efficiently assembled using a number of storage modules. Storage modules may be comprised of a pair of shelf modules, each comprising a number of defined storage locations for storing totes, cartons, trays or other containers. The shelf modules may themselves be modular units comprising a number of horizontal storage levels affixed to a pair of vertical support assemblies at each end of the shelf modules. The pair of shelf modules are accurately spaced apart from each other so as to allow a mobile robot to pass between the pair of shelf modules and retrieve or deliver inventory to storage locations in either shelf module in the finished storage structure.

The pair of shelf modules may be accurately spaced from each other by mounting the shelf modules to tie beams at the bottom and tie plates at the top. The tie beams and plates have registration features in the form of circular pins. The top and bottom surfaces of the shelf modules in turn include circular holes and oblong slots fitting over the pins on the tie beam and tie plate. The arrangement of pins, holes and slots ensures accurate positioning of the shelf modules and prevents improper assembly of the shelf modules on the tie beam and plate. The tie beams and tie plates have additional registration features to allow for quick and accurate assembly of multiple storage modules oriented horizontally and/or vertically with respect to each other.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal" as may be used herein are by way of example and for illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.25% of a given dimension.

Figure 1:
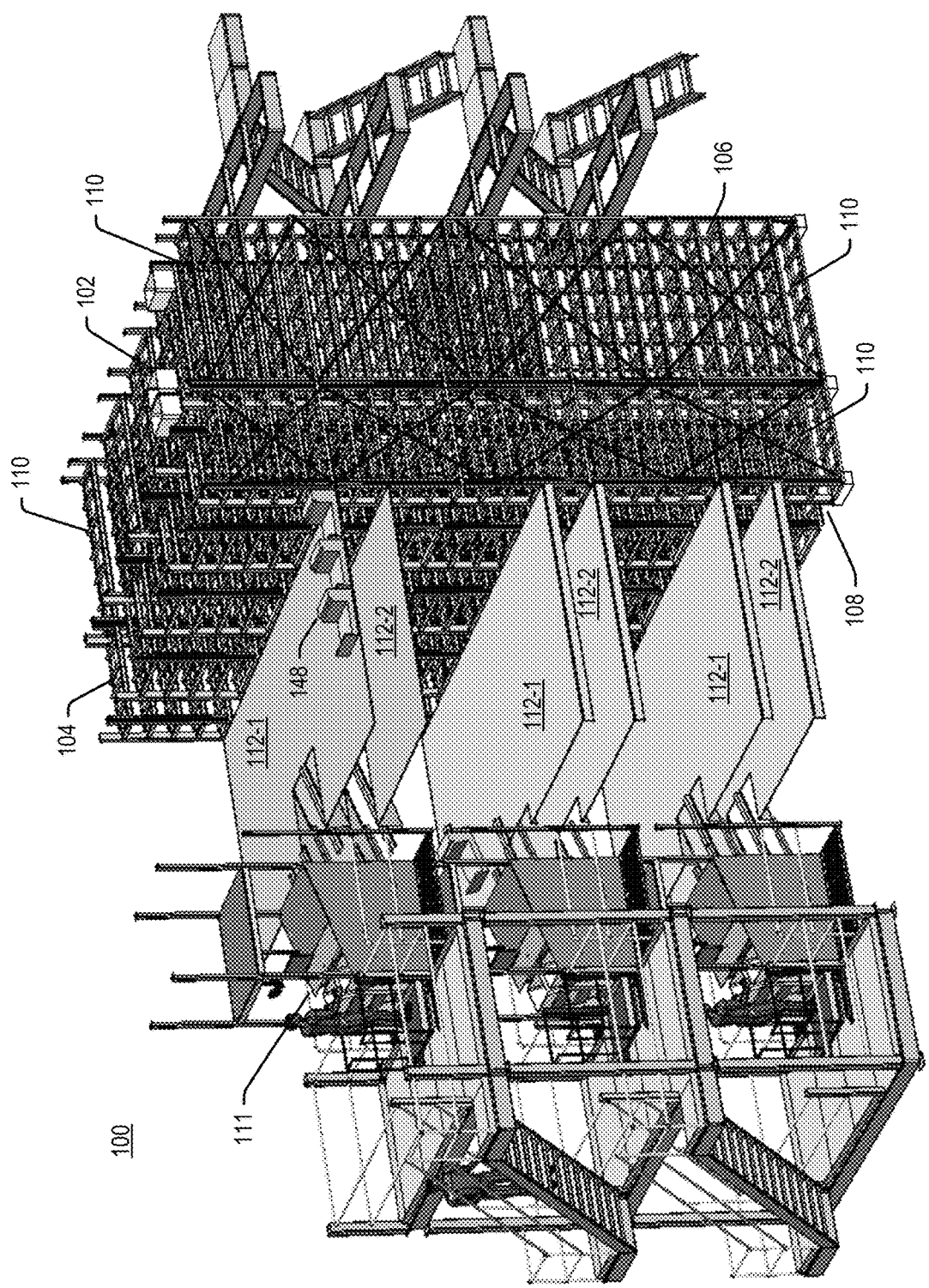
FIG. 1 is a perspective view of an order fulfillment facility according to embodiments of the present technology.

FIG. 1 shows a partial view of an embodiment of an order fulfillment facility 100 showing a storage structure 102 including a number of bays 104 of storage locations 106. In accordance with aspects of the present technology, the storage structure 102 may be formed of a number of storage modules 110 as explained below. The bays 104 defined by the storage modules 110 each include a y-z array of storage locations 106 in horizontal rows and level changing towers along the rows which in embodiments may be vertical towers. Mobile robots 148 may travel between storage levels in the z-direction within the level changing towers. The storage modules 110 form pairs of bays 104 that are arranged to face each other, separated by aisles 108. An aisle 108 may have a width such that a mobile robot 148 traveling within an aisle 108 may transfer containers to the bays 104 on either side of the aisle 108.

The order fulfillment facility 100 may further include decks 112 spaced apart at different horizontal levels of the storage structure 102. In the embodiment shown, the decks 112 are arranged in pairs 112-1 and 112-2, but need not be in further embodiments. The decks 112 may extend between the aisles so that robots can maneuver in the x-y plane of each deck to travel between different aisles. One of the decks 112-1 or 112-2 may also extend into the respective aisles to allow technicians to walk into an aisle 108 to service components within the aisle.

FIG. 1 also shows examples of workstations 111. In embodiments, each workstation is equipped to receive pairs of mobile robots. A first mobile robot at a station carries product totes, with items for fulfilling product requests. A second mobile robot at the station carries order totes, within which items from the product totes are placed to fulfill product requests. Workers at a workstation manually transfer items from a product tote to an order tote under guidance of an inventory control system at the workstation.

As noted above, the order fulfillment facility 100 may further include a number of mobile robots 148 for transferring totes or other product containers to and from workstations 111 and storage locations 106 in the bays 104. In embodiments, mobile robots 148 may be self-guided and/or rail-guided so as to move horizontally and vertically within aisles 108 to transfer totes or other product containers between the mobile robots 148 and storage locations 106. For example, a track system including horizontal rails may be affixed to the storage modules 110 at different vertical levels as explained below. The horizontal rails provide access to storage shelves on either side of an aisle 108 in the x-direction on a given level. As noted above, the bays 104 may include level changing towers within which the mobile robots may travel vertically in the z-direction between levels of storage locations 106.

Further details of the work stations, track system and mobile robot which may be used in conjunction with the storage modules 110 of the present technology are described for example in the following U.S. patents and patent applications: U.S. Pat. No. 9,139,363, to John Lert, entitled "Automated System For Transporting Payloads," issued Sep. 22, 2015; U.S. Patent Application Publication No. 2016/0355337, to John Lert and William Fosnight, entitled, "Storage and Retrieval System," filed on Jun. 2, 2016; and U.S. Patent Application Publication No. 2017/0313514, to John Lert and William Fosnight, entitled, "Order Fulfillment System," filed on May 10, 2017. Each of these patents and applications are incorporated by reference herein in their entirety.

Figure 2:
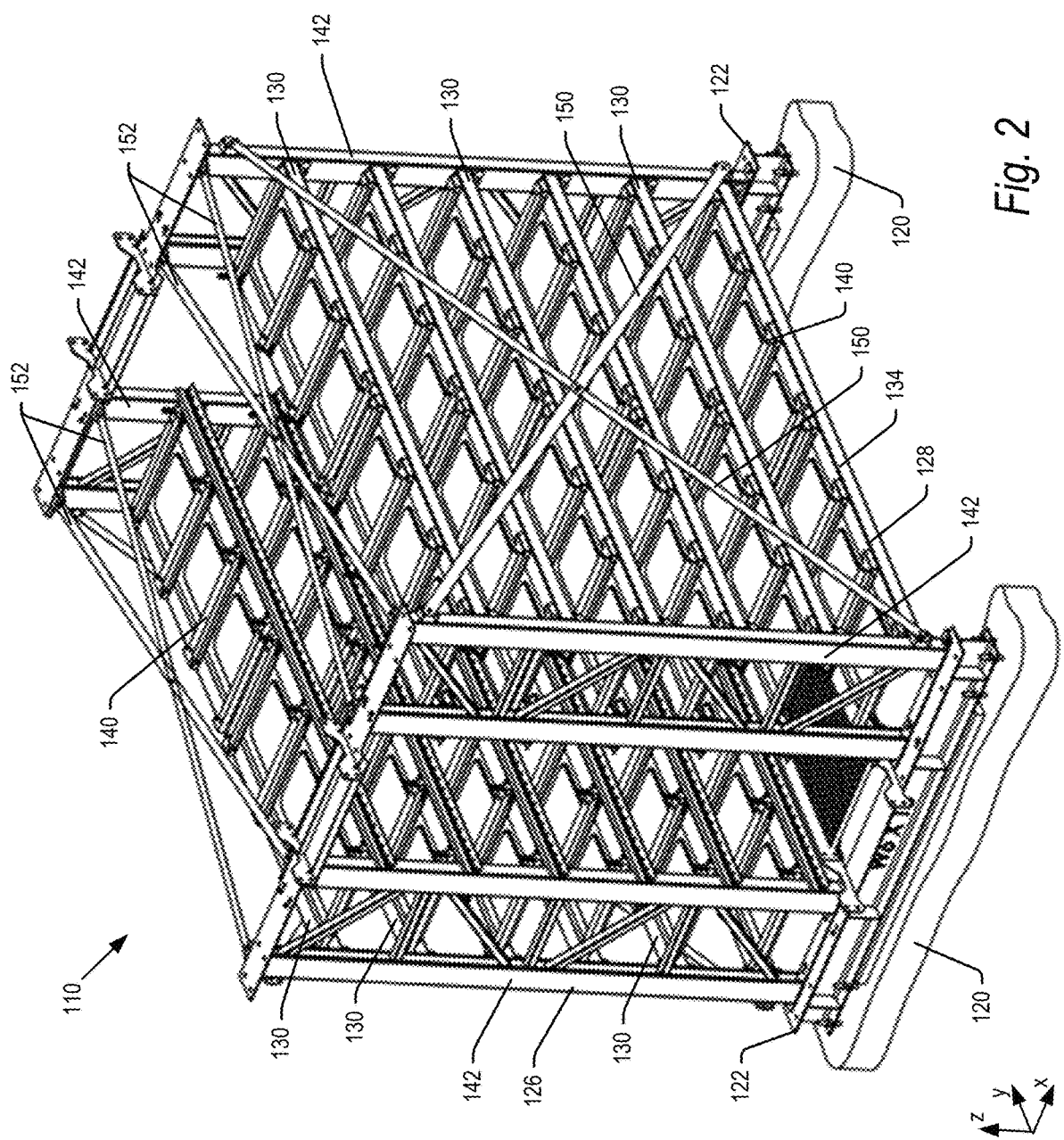
FIG. 2 is a front perspective view of a storage module according to embodiments of the present technology.
Figure 4B:
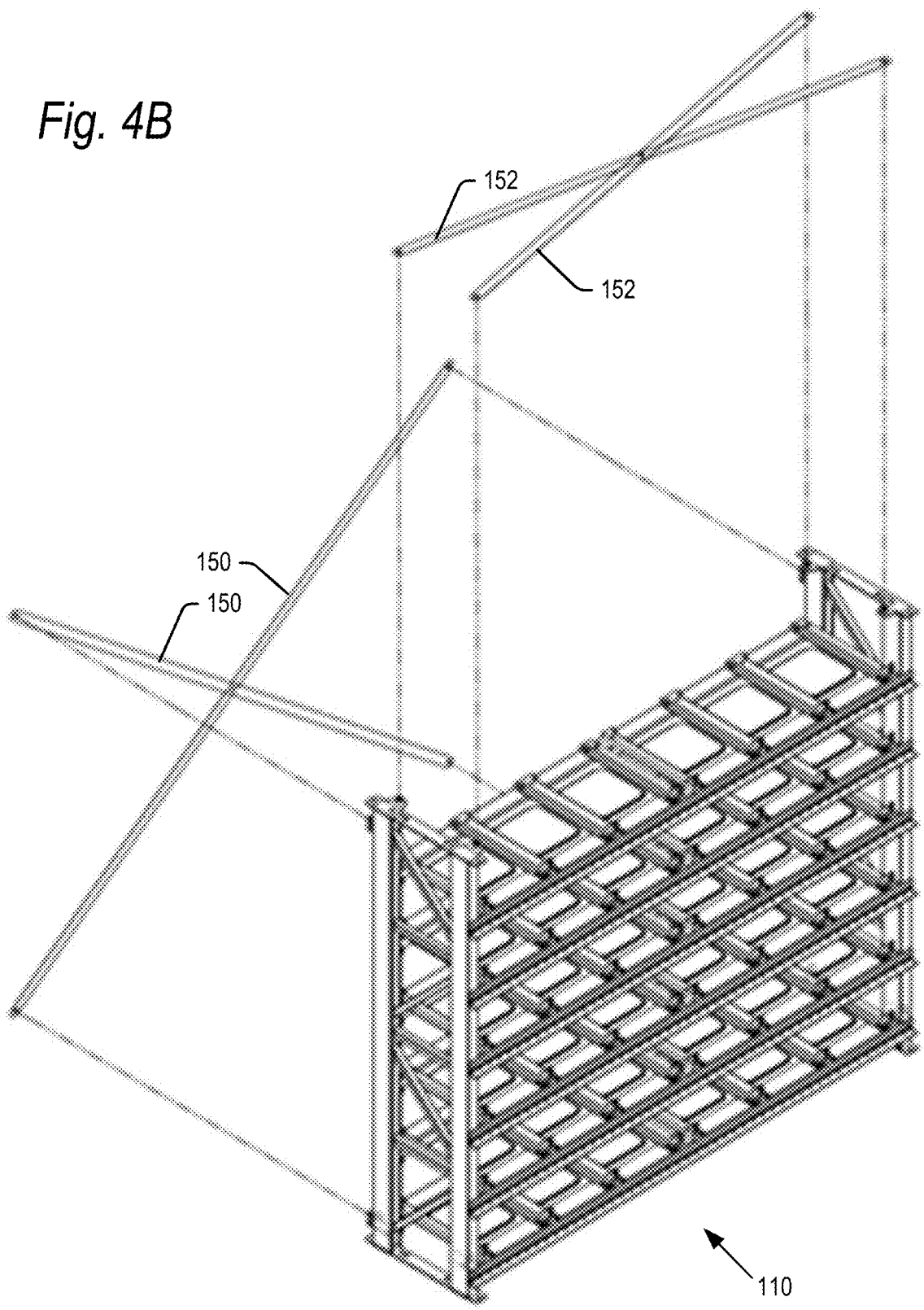
FIG. 4B is an exploded perspective view of a shelf module including cross braces according to embodiments of the present technology.

FIG. 1 shows a number of storage modules 110 assembled together into storage structure 102. FIG. 2 shows a single storage module 110. Further details of storage module 110 will now be described with reference to FIGS. 2 through 4B. The storage module 110 of FIG. 2 shows a first level storage module (i.e., a storage module use on the first level, adjacent a floor 120 of the facility 100). First level storage modules are placed onto foundation tie beams 122 which are bolted or otherwise is affixed to the floor 120.

Each storage module 110 is comprised of two shelf modules 126 and 128 spaced apart a specific and repeatable distance as explained below. The two shelf modules 126, 128, which may be identical to each other, each include a number of horizontal levels 130, as seen for example in FIG. 3A. The number of horizontal levels 130 in each shelf module 126, 128 may vary in different embodiments. The horizontal levels 130 in shelf module 126 may align horizontally with the horizontal levels 130 in shelf module 128.

As seen for example in FIGS. 3A through 4A, each horizontal level 130 in both shelf modules 126, 128 may include a pair of horizontal support members 134. A number of container guides 140 may extend generally perpendicularly between each pair of horizontal support members 134 at the various levels 130. The container guides 140 are used to define positions for containers to be stored at the various levels 130.

The horizontal support members 134 extend between and are connected to a pair of vertical support assemblies 142 at each end of the horizontal support members. Each vertical support assembly 142 may include a pair of vertical supports 144 and a series of reinforcing trusses 146 extending between the vertical supports 144. The horizontal support members 134 may be affixed to the vertical support assemblies 142 as by bolting, welding and/or other known attachment schemes. The levels 130 and the vertical support assemblies 142 may be formed of high-strength materials such as for example steel, galvanized steel, and other metals.

Assembly of the storage module 110 will now be described with reference to FIGS. 3A-5. The two shelf modules 126, 128 are assembled in a fixture at ground level by assembling the horizontal support members 134 and vertical support assemblies 142, and then affixing the horizontal support members 134 to the vertical support assemblies 142 while the vertical support assemblies are supported within a fixture.| Cross braces 150 are added to shelf module 126 prior to being removed from the fixture to ensure the shelf module 126 retains its squareness. As seen for example in FIGS. 2, 3A and 4B, the top surface in the x-y plane of each of the shelf modules 126, 128 may also include cross braces 152. Cross braces 150, 152 add structural rigidity to the shelf modules 126 and 128, for example by resisting moment forces about the x-, y- and z-axis, and maintaining the orthogonality of the horizontal support members 134 to the vertical support assemblies 142. The cross braces 150, 152 may be metal straps, or alternatively threaded-rod cross-bracing, and may be formed of a high-strength material, such as for example steel, galvanized steel, or other metals. It is understood that other structures or components may be added to strengthen the storage module 110. In one further example, the cross braces in at least the vertical plane may be replaced with a welded metal structure to provide the stiffening as well as an interface to support other system components.

The two shelf modules 126, 128 are then mounted to tie beams 122 (for first level storage modules 110). As explained below, the tie beams 122 are accurately positioned and include registration features to ensure precise and repeatable positioning and spacing of the shelf modules 126 and 128 with respect to each other.

Once affixed on tie beams 122, each shelf module 126, 128 has an interior surface in the y-z plane that face each other, and each has an exterior surface in the y-z plane, opposed to the interior surface, which face away from each other.

Robot support rails 145 (FIGS. 3B and 4A) may be affixed to each horizontal level 130 at the interior surfaces of the shelf modules 126, 128. These rails 145 are provided to support a mobile robot as it moves horizontally at any level 130 through a storage module 110.

As noted, the present technology includes several features to ensure quick and easy yet highly accurate placement of the shelf modules 126 and 128 in the storage module 110, which is repeatable across all storage modules 110. As seen in FIG. 5, bottom support plates 156 are provided at the bottom of each of the vertical support assemblies 142. The bottom support plates 156 are bolted to a pair of tie beams 122, with the bottom support plates at a first end of shelf modules 126, 128 bolted to the first tie beam, and the bottom support plates at the second opposed end of shelf modules 126, 128 bolted to the second tie beam.

Figure 6:
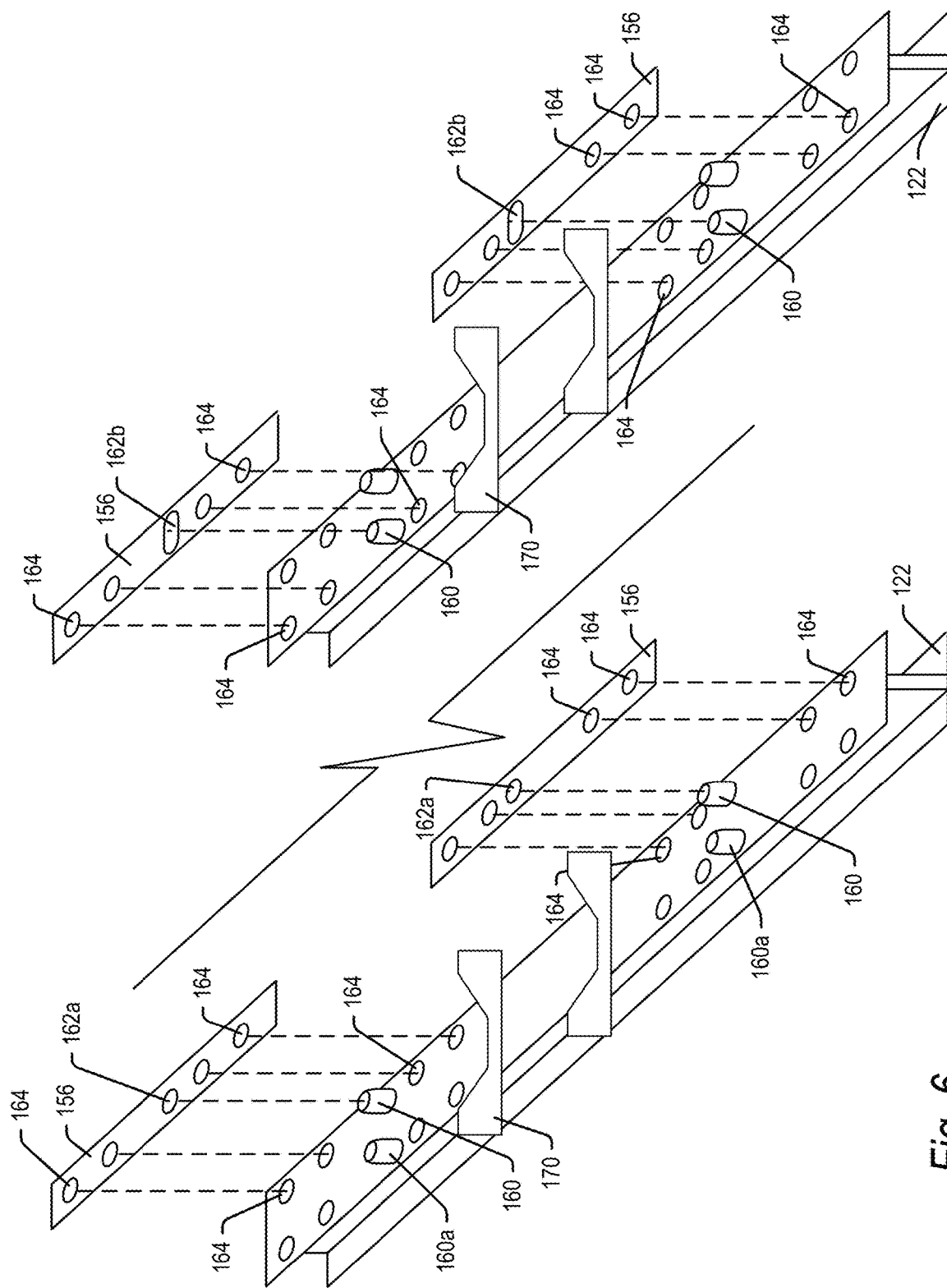
FIG. 6 is a partial perspective view showing registration features for affixing a storage module to tie beams according to embodiments of the present technology.
Figure 7B:
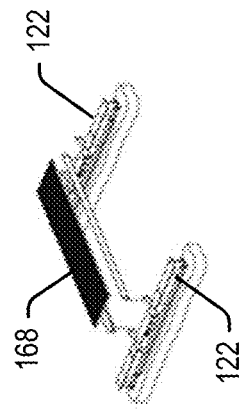
FIGS. 7A-7D are perspective views showing a storage module in different stages of assembly according to embodiments of the present technology.
Figure 7D:
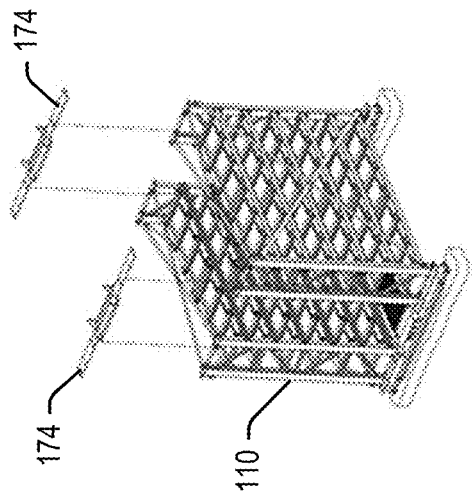
Figure 7A:
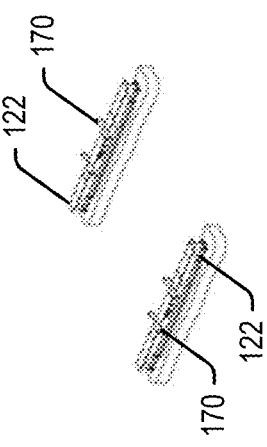
Figure 7C:
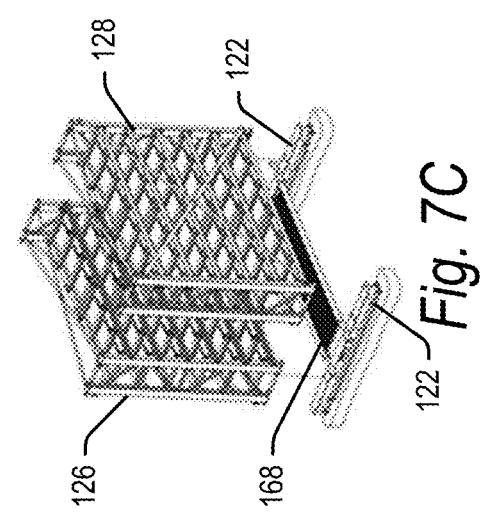

Initially, the tie beams 122 are accurately positioned with respect to each other, e.g. +/−0.5 mm in all 6 degrees of freedom, using known surveying methods. The two shelf modules 126, 128 are then lowered onto the tie beams 122, using locating pins on the tie beams for easy and accurate placement. FIG. 6 shows the pair of tie beams 122 and the bottom support plates 156. The shelf modules 126 and 128 are omitted for clarity. As shown, each tie beam 122 includes a pair of locating pins 160 extending upward from an upper surface of the tie beams 122. The bottom support plates 156 (affixed to the shelf modules 126, 128) are lowered onto the tie beams 122 so that the locating pins 160 are received within openings 162 in each of the bottom support plates 156.

The openings 162 comprise a pair of circular holes 162*a* on the bottom support plates 156 received on the first tie beam, and a pair of oblong slots 162*b* on the bottom support plates 156 received on the second tie beam. The slots 162*b* in one end of the shelf modules are provided to account for any tolerances in the initial placement of the tie beams, and any tolerances in the fabrication of the shelf modules. Thus, the length of the slots 162*b* may be the maximum tolerances of both the tie beam placement and the shelf module fabrication. In embodiments, the slots 162*b* may be approximately 3 mm longer than the hole diameters, but they may be smaller or larger than that in further embodiments. In order to allow all vertical support assemblies 142 to be the same, the holes and slots may alternatively be opposite each other on each tie beam 122.

Once the shelf modules 126, 128 are seated on the locating pins 160, the shelf modules 126, 128 may be bolted to the tie beams 122 with bolts (not shown) fit through bolt holes 164 in the bottom support plates 156 and tie beams 122. The shelf modules 126, 128 may alternatively or additionally be welded to the tie beams 122 in further embodiments. A catwalk 168 (FIGS. 3A and 5) may be bolted between the tie beams 122 after placement of the shelf modules. As indicated in the order of FIGS. 7A-7D, a catwalk 168 may be alternatively installed prior to one or both shelf modules being lowered onto the locating pins. Flanges 170 may be used to secure the catwalk 168 in the storage module 110.

The tie beams 122 with the locating pins 160 provide quick, easy and accurate spacing of the shelf modules 126, 128 to form a storage module 110. The shelf modules 126 and 128 are preferably spaced such that a mobile robot (not shown) may travel within the space between the shelf modules 126, 128 and transfer inventory to storage locations in either shelf module.

Additionally, the position datum for each horizontally-aligned storage module 110 is reestablished with each tie beam 122. For example, in FIG. 6, each tie beam 122 includes a second set of locating pins (one set labeled as 160*a*) and bolt holes for mounting additional storage modules 110 to the left and/or right of the above-described storage module 110. The pairs of locating pins 160 on each tie beam 122 ensure that adjacent storage modules 110 will be quickly, easily and accurately aligned with respect to each other.

The tie beams 122 are provided to accurately position and secure bottom portions of first level storage modules 110. As shown in FIG. 5, tie plates 174 may be affixed at the top of shelf modules 126, 128, extending between the shelf modules 126, 128, to fix the spacing of top portions of the shelf modules 126, 128. The tie plates 174 may include the same configuration of locating pins as in tie beams 122, but the locating pins may extend downward from the tie plates 174 into holes on one side of the storage module, and slots in the opposite side of the storage module as explained above. The tie plates 174 may bolt to upper support plates 176 at the top ends of the vertical support assemblies 142 in each of the shelf modules 122, 128.

The tie plates 174 may also serve as the new datum for placement of additional storage modules 110 vertically above other storage modules 110. That is, tie plates 174 may have the same configuration of locating pins as in tie beams 122 extending upward (as well as downward as described above) so that a second storage module is to be aligned on top of and bolted to a first storage module. As seen in FIG. 5, tie plates 174 also include flanges 170 for fixing additional levels of catwalks 168.

Referring now to FIGS. 8-13D, one or more modules at a given level may include structure to enable a mobile robot to move vertically in the z-direction. These so-called level changing tower modules 210 may be aligned vertically with each other to allow mobile robots to travel vertically throughout the entire storage structure 102. As explained below, the level changing tower modules 210 may include vertical towers within which mobile robots may move vertically, and horizontal levels 130 as explained above within which mobile robots may move horizontally to enter or exit the vertical towers.

Figure 8:
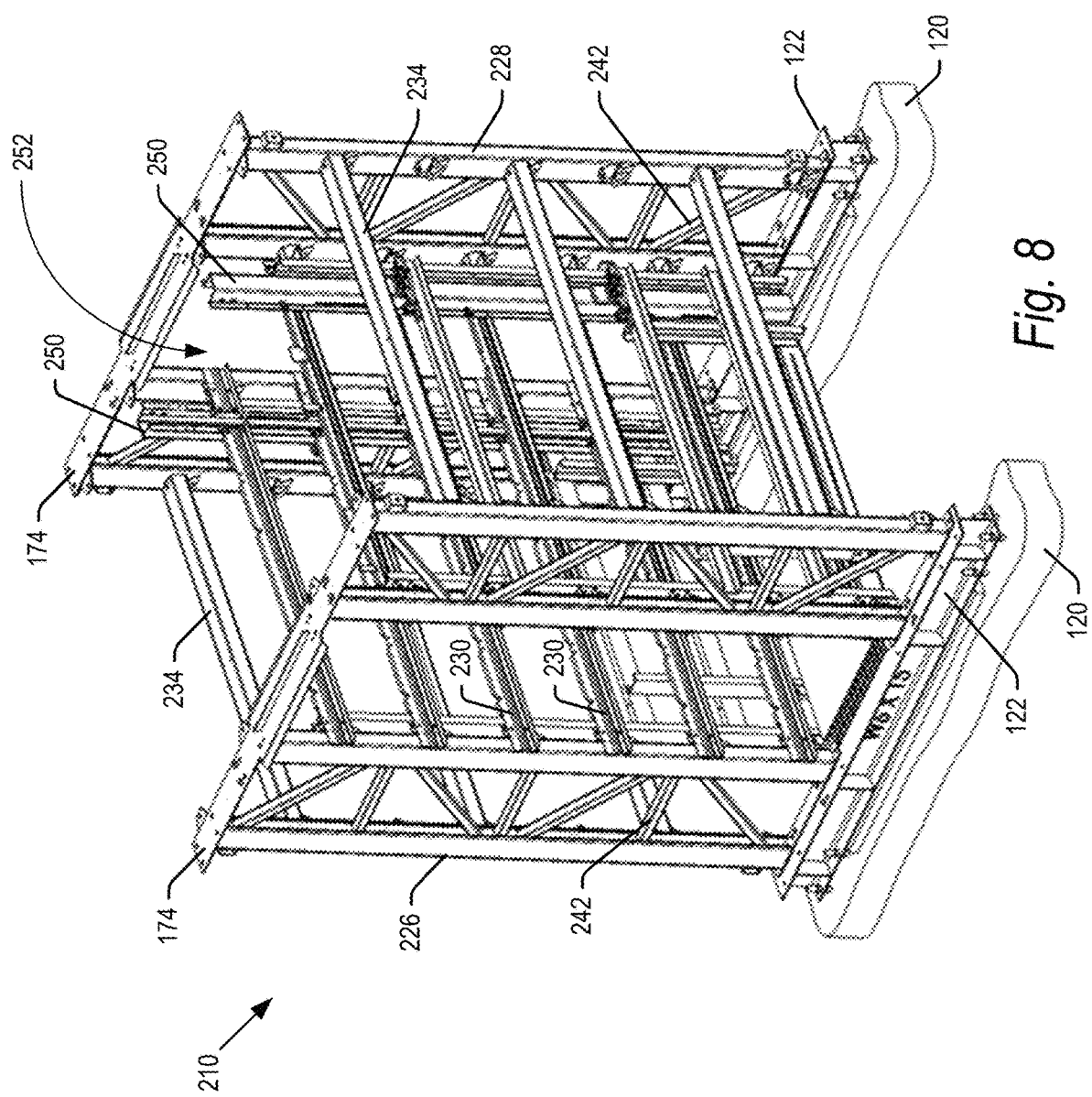
FIG. 8 is a front perspective view of a level changing tower module according to embodiments of the present technology.
Figure 9:
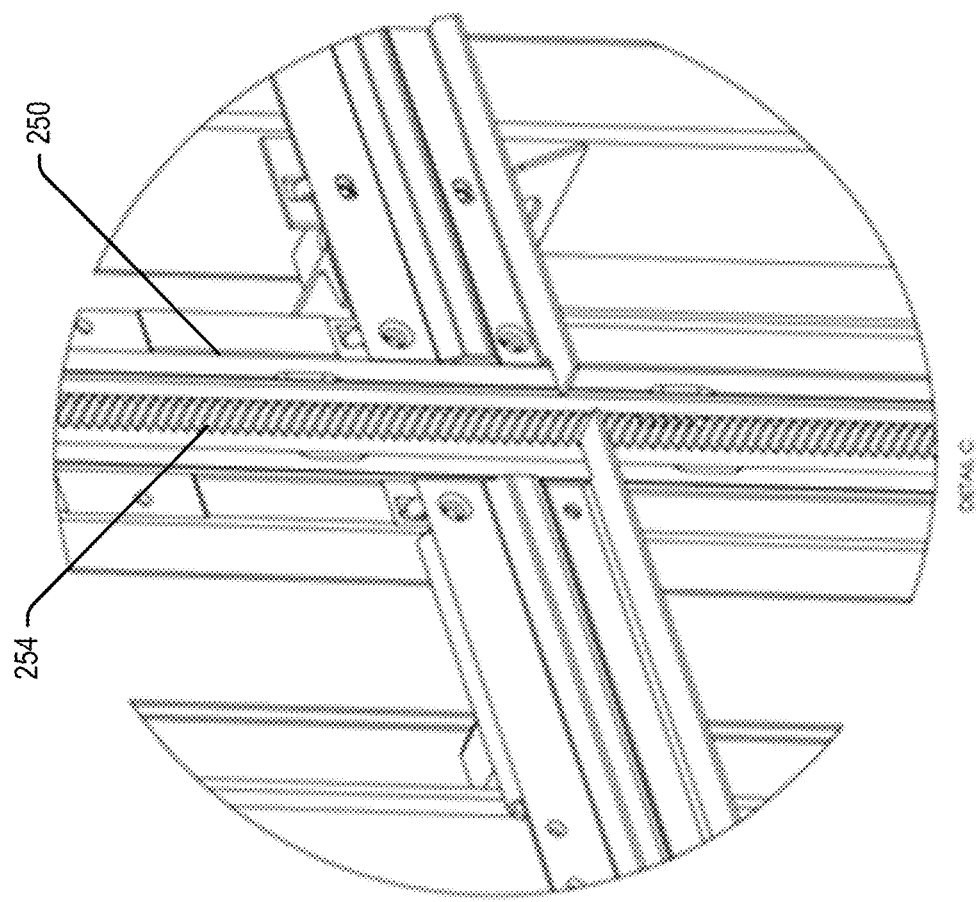
FIG. 9 is an enlarged view of a portion of a channel enabling vertical travel of a mobile robot within the level changing tower module according to embodiments of the present technology.

As seen in FIG. 8, a level changing tower module 210 may include a pair of rail and channel modules 226 and 228 which may be mounted at their bottom surfaces to a pair of tie beams 122 (if at the ground level) as described above for shelf modules 126 and 128. As described above with respect to shelf modules 126, 128, the rail and channel modules 226, 228 may be quickly, easily and accurately spaced from each other by registration features on the tie beams 122. The rail and channel modules 226, 228 may also be affixed to each other at their tops by a pair of tie plates 174, again as described above with respect to shelf modules 126 and 128. The tie plates 174 allow a number of tower modules 210 to be stacked vertically so that mobile robots may move vertically throughout the entire support structure 102.

Each of the rail and channel modules 226, 228 may include vertical support assemblies 242 at opposed ends, which may be similar in construction to the vertical support assemblies 142 described above. Each of the rail and channel modules 226, 228 may further include horizontal support members 234 forming horizontal levels 230, which may be similar in construction to the horizontal levels 130 described above.

Unlike storage module 110, level changing tower module 210 may include a pair of vertical channels 250 defining a vertical tower 252 through which a mobile robot may move vertically through the level changing tower module 210. Each channel 250 may include a rack gear 254 as shown for example in FIG. 9. Further details of a vertical tower including a channel and rack gear such as tower 252, and a mobile robot capable of vertical travel within such a vertical tower are disclosed in applicant's co-pending U.S. Patent Application Publication No. 2017/0313514, to John Lert and William Fosnight, entitled, "Order Fulfillment System," filed on May 10, 2017, which application is incorporated by reference herein in its entirety.

FIGS. 10A, 10B and 10C show top, end and side views, respectively, of the tower module 210. The two rail and channel modules 226, 228 used to construct the tower module 210 are visible in the top and end views of FIGS. 10A and 10B. As with storage module 110, each tower module may be built in a fixture that accurately holds the two welded vertical support assemblies 242 while a welded frame that supports the horizontal support members 234 and robot support rails 245 are bolted into place between the vertical support assemblies 242. Containers may or may not be stored in the tower modules 210, but the same horizontal support members 234 are used to secure the exterior sides of the rail and channel modules 226 and 228.

Figure 11B:
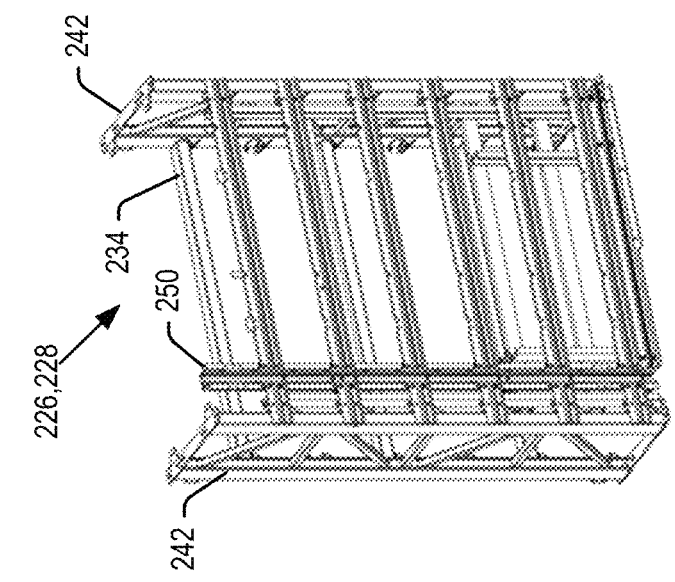
FIGS. 11A and 11B are an exploded perspective view and assembled perspective view, respectively, of a rail and channel module according to embodiments of the present technology.
Figure 11A:
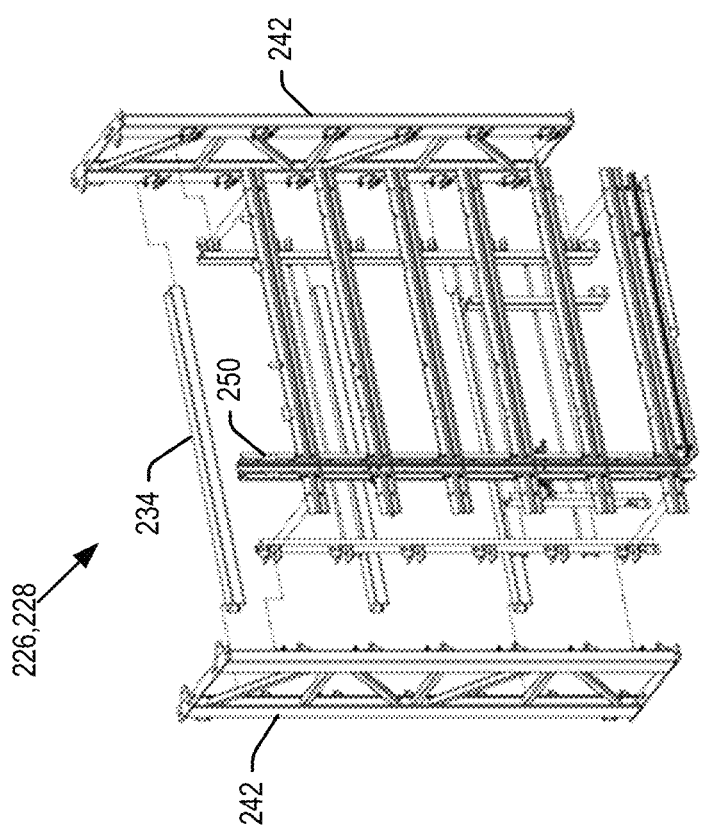

FIGS. 11A and 11B are exploded and assembled views of rail and channel modules 226, 228, including the vertical support assemblies 242, horizontal support members 234 and vertical channels 250. As previously mentioned, these components are assembled in a fixture at ground level prior to being lifted into place to comprise a tower module 210 in the automated storage facility 100.

Figure 12:
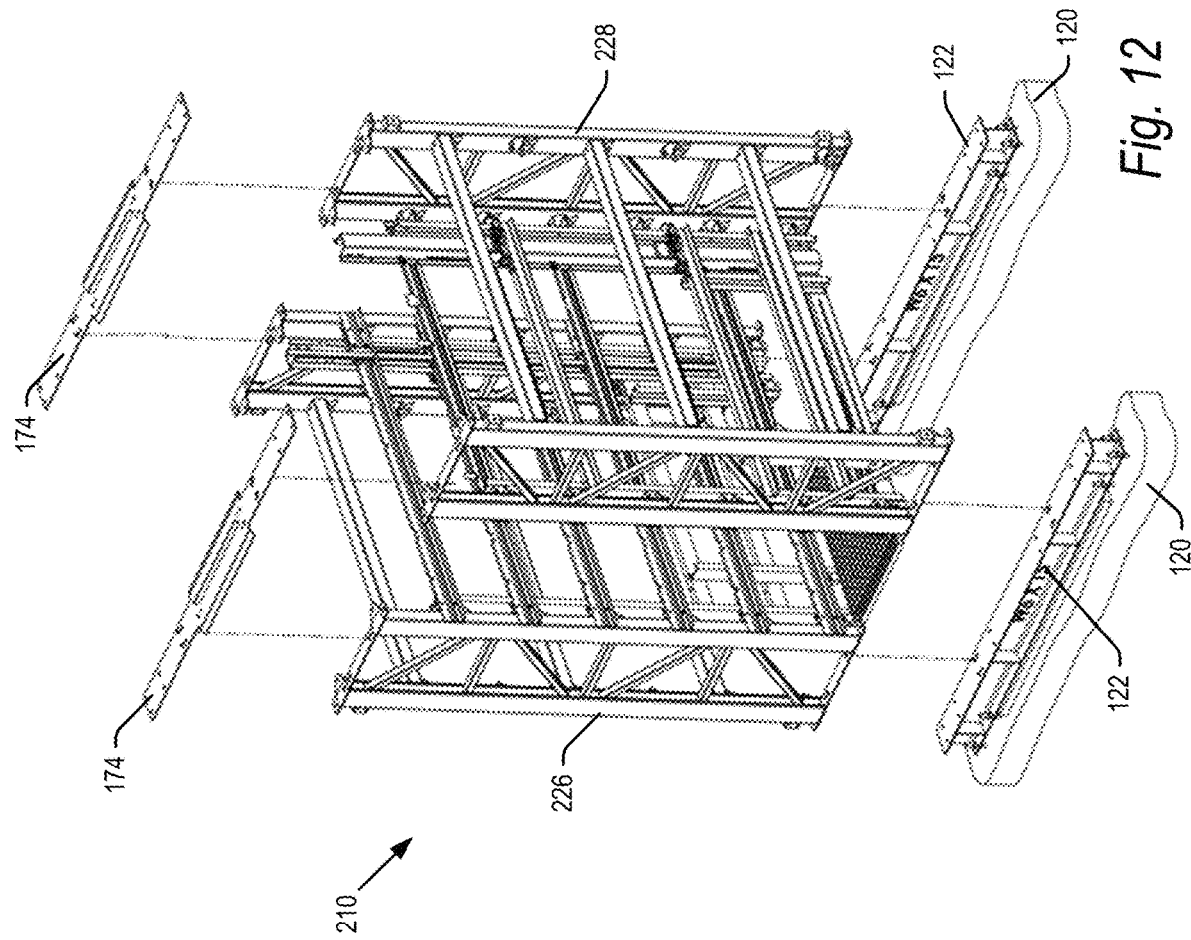
FIG. 12 is an exploded perspective view of a tower module according to embodiments of the present technology.

FIG. 12 is an exploded perspective view of the level changing tower module 210. As mentioned above, the tower module 210 may attach to the tie beams 122 and tie plates 174 using registration features and fasteners such as bolts and/or welds to provide quick, easy and accurate assembly of the tower module 210. As noted above, the tie beams 122 and tie plates 174 may reestablish a position datum for storage modules 110 and/or tower modules 210 which may lie horizontally adjacent to the tower module 210 shown in FIG. 12.

Figure 13:
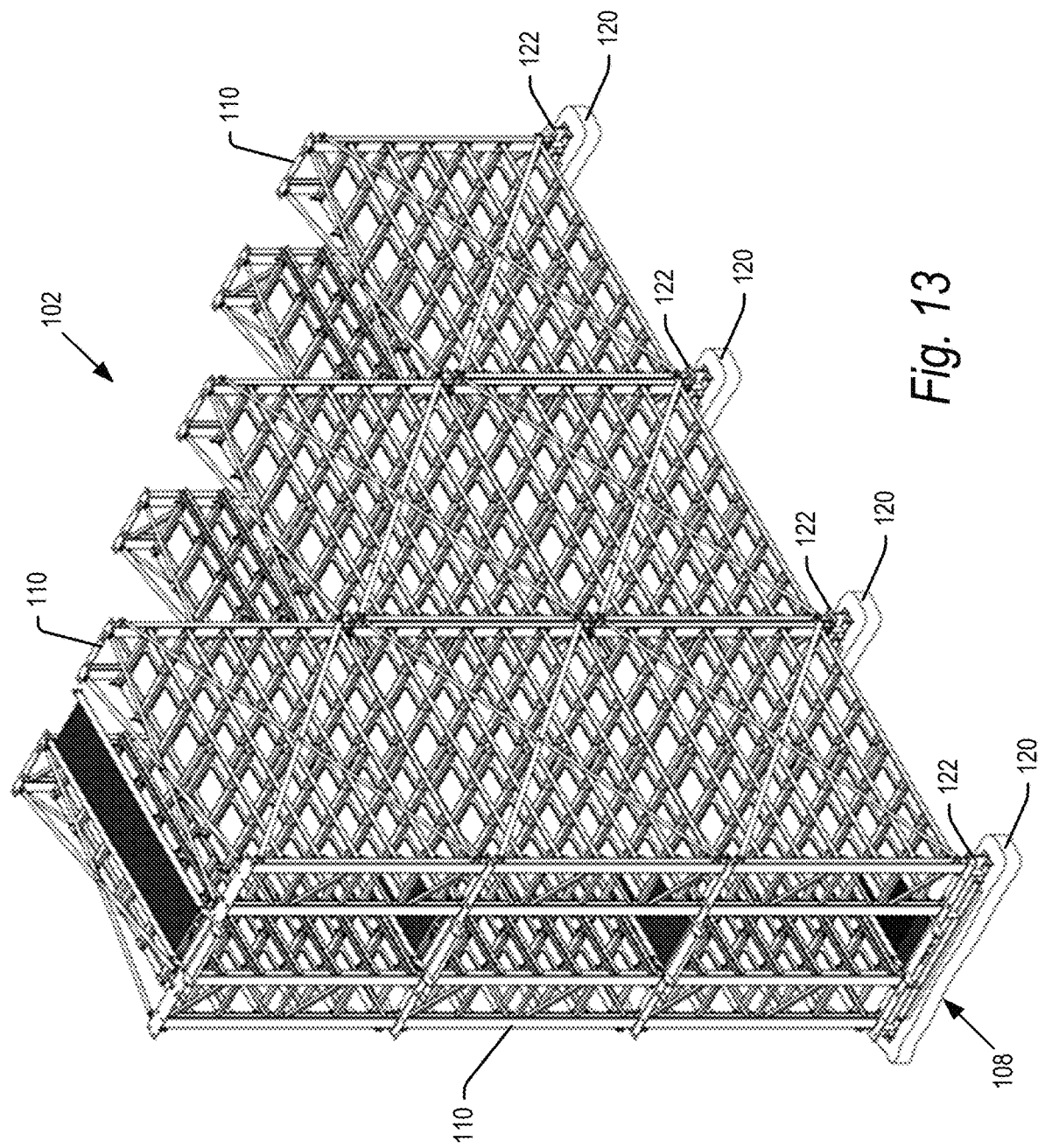
FIGS. 13 and 14 are perspective and side views of a storage structure formed from a plurality of storage modules according to embodiments of the present technology.
Figure 14:
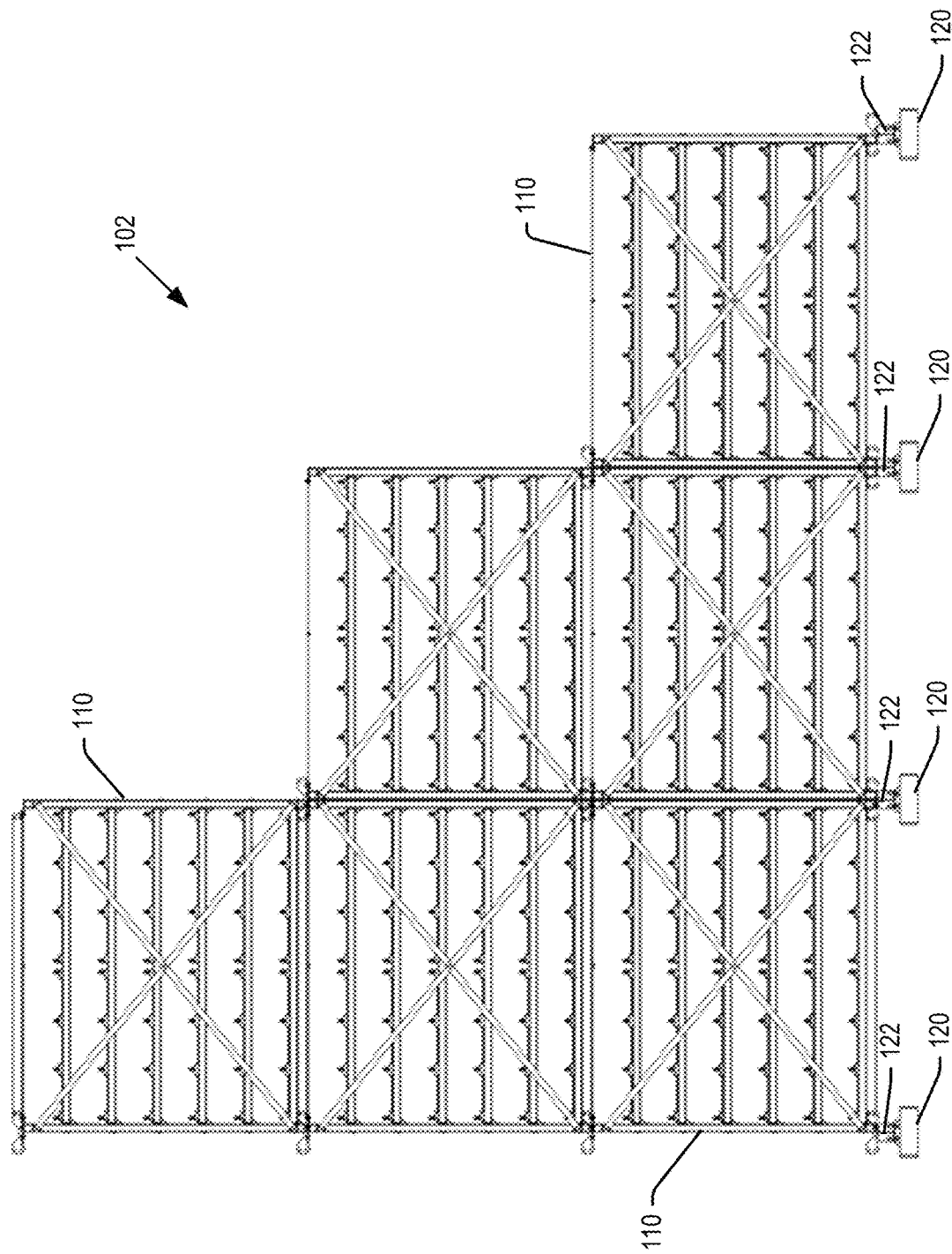

FIGS. 13 and 14 are perspective and side views of storage modules 110 assembled vertically and horizontally into a storage structure 102. While storage modules 110 are shown, it is understood that one or more of the modules 110 may be replaced with tower modules 210. The spacing between shelf modules 126, 128 defines an aisle 108 as described above respect to FIG. 1. The configuration shown in FIGS. 13 and 14 is a way of example only, and it is understood the storage modules 110 and tower modules 210 may be assembled in any of a wide variety of other configurations to provide a storage structure 102.

In summary, the present technology relates to a structure for an order fulfillment facility, the structure comprising: a plurality of storage modules, the plurality of storage modules each comprising a pair of spaced apart shelf modules, each of the spaced apart shelf modules comprising storage shelves for storing inventory containers, wherein the plurality of storage modules are configured to be assembled vertically and horizontally with respect to each other.

In another example, the present technology relates to a structure for an order fulfillment facility, the structure comprising: first and second storage modules configured to be positioned end-to-end with each other, the first storage module, comprising: a first end having a first support plate at a bottom of the first storage module; a second end opposite the first end and having a second support plate at the bottom of the first storage module; and a first set of storage locations for storing inventory containers; the second storage module comprising: a third end having a third support plate at a bottom of the second storage module; a fourth end opposite the third end and having a fourth support plate at the bottom of the second storage module; and a second set of storage locations for storing inventory containers; and a first tie beam configured to support the first end of the first storage module, wherein one of the first tie beam and first support plate comprises a first locating pin, and the other of the first tie beam and first support plate comprises a first locating hole, the first locating pin configured to be received through the first locating hole to align the first support plate to the first tie beam; a second tie beam configured to support the second end of the first storage module and the third end of the second storage module, wherein one of the second tie beam and second support plate comprises a second locating pin, and the other of the second tie beam and second support plate comprises a second locating hole, the second locating pin configured to be received through the second locating hole to align the second support plate to the second tie beam, and wherein one of the second tie beam and third support plate comprises a third locating pin, and the other of the second tie beam and third support plate comprises a third locating hole, the third locating pin configured to be received through the third locating hole to align the third support plate to the third tie beam, and to align the third support plate to the second support plate.

In another example, the present technology relates to a structure for an order fulfillment facility, the structure comprising: first and second storage modules configured to be positioned one-on-top of each other, the first storage module, comprising: a first end, comprising: a first support plate at a bottom of the first storage module, and a first tie plate at a top of the first storage module; a second end opposite the first end, comprising: a second support plate at the bottom of the first storage module, and a second tie plate at a top of the second storage module; and a first set of storage locations for storing inventory containers; a first tie beam configured to support the first end of the first storage module, wherein one of the first tie beam and first support plate comprises a first locating pin, and the other of the first tie beam and first support plate comprises a first locating hole, the first locating pin configured to be received through the first locating hole to align the first support plate to the first tie beam; a second tie beam configured to support the second end of the first storage module, wherein one of the second tie beam and second support plate comprises a second locating pin, and the other of the second tie beam and second support plate comprises a second locating hole, the second locating pin configured to be received through the second locating hole to align the second support plate to the second tie beam; the second storage module comprising: a third end, comprising: a third support plate at a bottom of the second storage module, a fourth end opposite the third end and comprising a fourth support plate at the bottom of the second storage module, and a second set of storage locations for storing inventory containers; wherein one of the first tie plate and third support plate comprises a third locating pin, and the other of the first tie plate and third support plate comprises a third locating hole, the third locating pin configured to be received through the third locating hole to align the third support plate to the first tie plate; and wherein one of the second tie plate and fourth support plate comprises a fourth locating pin, and the other of the second tie plate and fourth support plate comprises a fourth locating hole, the fourth locating pin configured to be received through the fourth locating hole to align the fourth support plate to the second tie plate.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A structure for an order fulfillment facility, the structure comprising:
   first and second storage modules each having a long side defining a length and a short side defining a width, the length being longer than the width, the first and second storage modules configured to be positioned end-to-end with each other with the short side of the first module facing the short side of the second module, the first storage module, comprising:
   a first end having a first support plate at a bottom of the first storage module;
   a second end opposite the first end and having a second support plate at the bottom of the first storage module; and
   a first set of storage locations for storing inventory containers;
   the second storage module comprising:
   a third end having a third support plate at a bottom of the second storage module;
   a fourth end opposite the second end and having a fourth support plate at the bottom of the second storage module; and
   a second set of storage locations for storing inventory containers; and
   a first tie beam configured to support the first end of the first storage module, wherein one of the first tie beam and first support plate comprises a first locating pin, and the other of the first tie beam and first support plate comprises a first locating hole, the first locating pin configured to be received through the first locating hole to align the first support plate to the first tie beam;
   a second tie beam configured to support the second end of the first storage module and the third end of the second storage module, wherein one of the second tie beam and second support plate comprises a second locating pin, and the other of the second tie beam and second support plate comprises a second locating hole, the second locating pin configured to be received through the second locating hole to align the second support plate to the second tie beam, and
   wherein one of the second tie beam and third support plate comprises a third locating pin, and the other of the second tie beam and third support plate comprises a third locating hole, the third locating pin configured to be received through the third locating hole to align the third support plate to the second tie beam, and to align the third support plate to the second support plate.

2. The structure of claim 1, wherein the one of the first and second holes is oblong to allow for tolerances in a first distance between the first and second locating pins.

3. The structure of claim 1, further comprising a third tie beam configured to support the fourth end of the second storage module, wherein one of the third tie beam and fourth support plate comprises a fourth locating pin, and the other of the third tie beam and fourth support plate comprises a fourth locating hole, the fourth locating pin configured to be received through the fourth locating hole to align the fourth support plate to the second tie beam.

4. The structure of claim 3, wherein the one of the third and fourth holes is oblong to allow for tolerances in a second distance between the third and fourth locating pins.

5. The structure of claim 1, wherein the first storage module comprises:
   a first vertical support assembly mounted vertically up from the first support plate, and
   a second vertical support assembly mounted vertically up from the second support plate.

6. The structure of claim 5, further comprising a first plurality of horizontal levels extending between the first and second vertical support assemblies, the first set of storage locations provided in the first plurality of horizontal levels.

7. The structure of claim 6, further comprising a pair of cross braces extending diagonally between the first and second vertical support assemblies for maintaining a planarity of the first storage module.

8. The structure of claim 6, wherein the second storage module comprises:
a third vertical support assembly mounted vertically up from the third support plate, and
a fourth vertical support assembly mounted vertically up from the fourth support plate.

9. The structure of claim 8, further comprising a second plurality of horizontal levels extending between the third and fourth vertical support assemblies, the second set of storage locations provided in the second plurality of horizontal levels.

10. A structure for an order fulfillment facility, the structure comprising:
first and second storage modules configured to be positioned end-to-end with each other, the first storage module, comprising:
a first end having first and second vertical supports supported on a first support plate at a bottom of the first storage module;
a second end opposite the first end and having third and fourth vertical supports mounted on a second support plate at the bottom of the first storage module; and
a first set of storage locations for storing inventory containers;
the second storage module comprising:
a third end having fifth and sixth vertical supports supported on a third support plate at a bottom of the second storage module;
a fourth end opposite the second end and having seventh and eighth vertical supports supported on a fourth support plate at the bottom of the second storage module; and
a second set of storage locations for storing inventory containers; and
a first tie beam configured to support the second end of the first storage module and the third end of the second storage module, wherein one of the first tie beam and second support plate comprises a first locating pin, and the other of the first tie beam and second support plate comprises a first locating hole, the first locating pin configured to be received through the first locating hole to align the second support plate to the first tie beam, and
wherein one of the first tie beam and third support plate comprises a second locating pin, and the other of the first tie beam and third support plate comprises a second locating hole, the second locating pin configured to be received through the second locating hole to align the third support plate to the first tie beam, and to align the third support plate to the second support plate.

11. The structure of claim 10, wherein the one of the first and second holes is oblong to allow for tolerances in a first distance between the first and second locating pins.

12. The structure of claim 10, further comprising a second tie beam configured to support the fourth end of the second storage module, wherein one of the second tie beam and fourth support plate comprises a third locating pin, and the other of the second tie beam and fourth support plate comprises a third locating hole, the third locating pin configured to be received through the third locating hole to align the fourth support plate to the second tie beam.

13. The structure of claim 12, wherein the one of the third and fourth holes is oblong to allow for tolerances in a second distance between the third and fourth locating pins.

14. The structure of claim 10, further comprising a first plurality of horizontal levels extending between the first, second, third and fourth vertical supports, the first set of storage locations provided in the first plurality of horizontal levels.

15. The structure of claim 14 further comprising a pair of cross braces extending diagonally between the first and third vertical supports for maintaining a planarity of the first storage module.

16. The structure of claim 10, further comprising a second plurality of horizontal levels extending between the fifth, sixth, seventh and eighth vertical supports, the second set of storage locations provided in the second plurality of horizontal levels.

17. The structure of claim 16 further comprising a second pair of cross braces extending diagonally between the fifth and seventh vertical supports for maintaining a planarity of the second storage module.

\* \* \* \* \*

UNITED STATES PATENT AND TRADEMARK OFFICE
CERTIFICATE OF CORRECTION

PATENT NO. : 11,363,883 B2
APPLICATION NO. : 17/179068
DATED : June 21, 2022
INVENTOR(S) : Lert, Jr. et al.

It is certified that error appears in the above-identified patent and that said Letters Patent is hereby corrected as shown below:

On the Title Page

References Cited (56), U.S. PATENT DOCUMENTS, page 2, Column 2, Line 11, please change "Lellimo" to --Iellimo--

Signed and Sealed this
Twentieth Day of September, 2022

Katherine Kelly Vidal
*Director of the United States Patent and Trademark Office*